United States Patent [19]

Nickol et al.

[11] Patent Number: 4,572,615
[45] Date of Patent: Feb. 25, 1986

[54] MULTIPLEXABLE METAL-INSULATOR-METAL LIQUID CRYSTAL CELL

[75] Inventors: Friedrich W. Nickol, Eppstein; Holm Baeger, Schwalbach, both of Fed. Rep. of Germany

[73] Assignee: VDO Adolf Schindling AG, Frankfurt am Main, Fed. Rep. of Germany

[21] Appl. No.: 520,063

[22] Filed: Aug. 3, 1983

[30] Foreign Application Priority Data

Aug. 7, 1982 [DE] Fed. Rep. of Germany ....... 3229584

[51] Int. Cl.⁴ .................. G02F 1/133; H01L 49/02
[52] U.S. Cl. ................ 350/334; 350/339 R; 357/6
[58] Field of Search ............. 350/332–334, 350/339 R; 357/6

[56] References Cited

U.S. PATENT DOCUMENTS

| 3,736,047 | 5/1973 | Gelber et al. | 350/339 R |
| 4,248,502 | 2/1981 | Bechteler et al. | 350/341 |
| 4,431,271 | 2/1984 | Okubo | 350/334 |

FOREIGN PATENT DOCUMENTS

| 0122477 | 7/1982 | Japan | 350/334 |
| 2091468 | 7/1982 | United Kingdom | 350/334 |

OTHER PUBLICATIONS

Baraff et al., "The Optimization of Metal-Insulated-Metal Non-Linear Devices for Use in Multiplex Liquid Crystal Displays" E-28 No. 6 IEEE Trans. on Elec. Devices Jun. 1981 pp. 736–739.

*Primary Examiner*—John K. Corbin
*Assistant Examiner*—David Lewis
*Attorney, Agent, or Firm*—Martin A. Farber

[57] ABSTRACT

A multiplexable liquid crystal cell having two substrates 1 and 3 which are spaced from each other and form between each other a cell space filled with liquid-crystal substance. Strip electrodes 2 are arranged on one substrate 1 while picture electrodes 4 are arranged on the other substrate 3 opposite the strip electrodes 2. An insulating layer 7 is arranged on the picture electrodes 4, said layer in its turn bearing a connecting contact 6 which leads to the data line 5.

19 Claims, 3 Drawing Figures

MULTIPLEXABLE METAL-INSULATOR-METAL LIQUID CRYSTAL CELL

The present invention relates to a multiplexable liquid-crystal cell having two substrates which are spaced from each other and form between each other a cell space filled with liquid-crystal substance, the cell having strip electrodes arranged on the cell-space side on the one substrate and picture electrodes arranged on the cell-space side on the other substrate opposite the strip electrodes, the picture electrodes being connected via metal-insulator-metal elements with data lines, also arranged on the substrate.

In such a liquid-crystal cell it is known first of all to apply data lines first of all by tantalum sputtering on the substrate which is to be provided with the picture electrodes. By partial anodization of this layer, an insulating layer is built up on the layer of tantalum. By the application of further conductor material both onto a part of the data line and onto a part of the uncovered substrate, a connecting contact is produced which extends into the region onto which the material for the picture electrode is then applied. The data line, the insulating layer and the connecting contact thereby form the metal-insulator-metal element which serves as so-called non-linear element for the control of the picture electrode.

The manufacture of this liquid-crystal cell not only requires a very large number of process steps but is also expensive, due to the anodic building up of the insulating layer.

Both the non-transparent data lines, which reduce the contrast of the display, and the reflecting picture electrodes interfere fwith the clarity of the display.

It is therefore the object of the present invention to create a liquid-crystal cell of the above-mentioned type which is simple to manufacture and has a high-contrast, readily readable display.

This object is achieved in accordance with the invention in the manner that over the picture electrode (4) which is arranged on the substrate (3) there is an insulating layer (7) which in its turn bears a connecting contact (6) which leads to the data line (5). By this development, the number of manufacturing steps can be reduced, since the metal-insulator-metal element (MIM element) consists of the picture electrode, the insulating layer and the connecting contact and thus, contrary to the known liquid-crystal cell, the picture electrode is at the same time a part of the MIM element. It is clear that instead of the metal layers of the MIM element, semiconductor layers can also be used.

The fine structure of the picture electrodes which is made possible and which can be produced without substantial problems of adjustment with respect to the data lines and connecting contacts makes good multiplexability possible, which leads to better optical contrast and thus to better legibility of the information.

In order that the legibility of the information not be impaired, the insulating layer can be transparent. If, in this connection, the insulating layer (7) completely covers the picture electrode then this layer performs both the function of part of the MIM element and the function of an insulator for the picture electrode. Such an insulator, to be applied in a separate operation, is thus not necessary.

If this insulating layer (7) has an index of refraction which is between the index of refraction of the liquid-crystal substance and the index of refraction of the transparent picture electrode (4) then it also fulfills a third function in that, by the removing of reflections from the picture electrodes, it leads to better higher-contrast legibility thereof.

The insulating layer may in this connection have an index of refraction of between 1.4 and 2.0, and preferably of 1.8.

Another function can furthermore be performed by the insulating layer (7) in that it has a property which orients the adjoining liquid-crystal substance and thus is simultaneously also an orientation layer.

If the data lines (5) and/or the connecting contact (6) consist of a transparent material, for instance indium tin oxide, then they cannot interfere with the good legibility of the display. The data line (5) and the connecting contact (6) are in this connection preferably applied in one operation.

If an anti-reflection layer covers the picture electrode (4) and/or the data line (5) and/or the connecting contact, no reflection which reduces the contrast and the legibility can come from any of the parts covered. This anti-reflection layer can in this case furthermore also have a property of orienting the adjoining liquid-crystal substance as well as an insulating property, and can thus fulfill several functions.

If the data line is arranged parallel to the strip electrodes and opposite the space between two strip electrodes, then the data line and a strip electrode are not close to each other so that the field present between the data line and the strip electrode is only very slight.

With the above and other objects and advantages in view, the present invention will become more clearly understood in connection with the detailed description of preferred embodiments, when considered with the accompanying drawings, of which:

Figure 1:
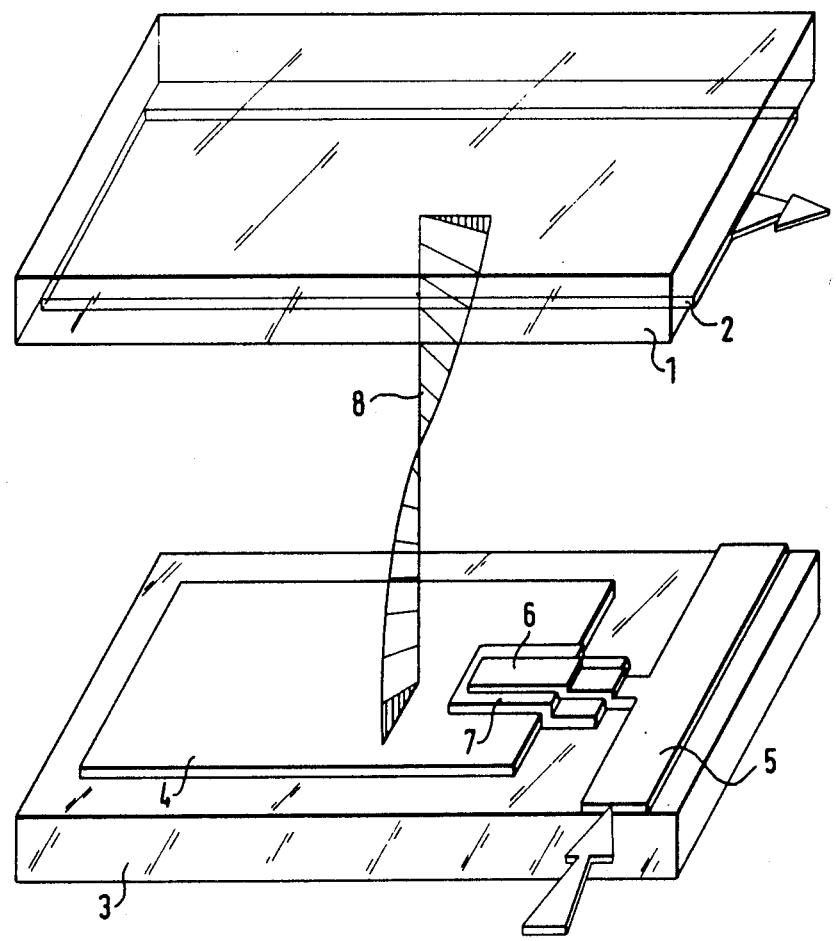
FIG. 1 is a perspective view of a portion of a liquid-crystal cell according to the invention partially in exploded view, the portion being that of a single picture element.
Figure 2:
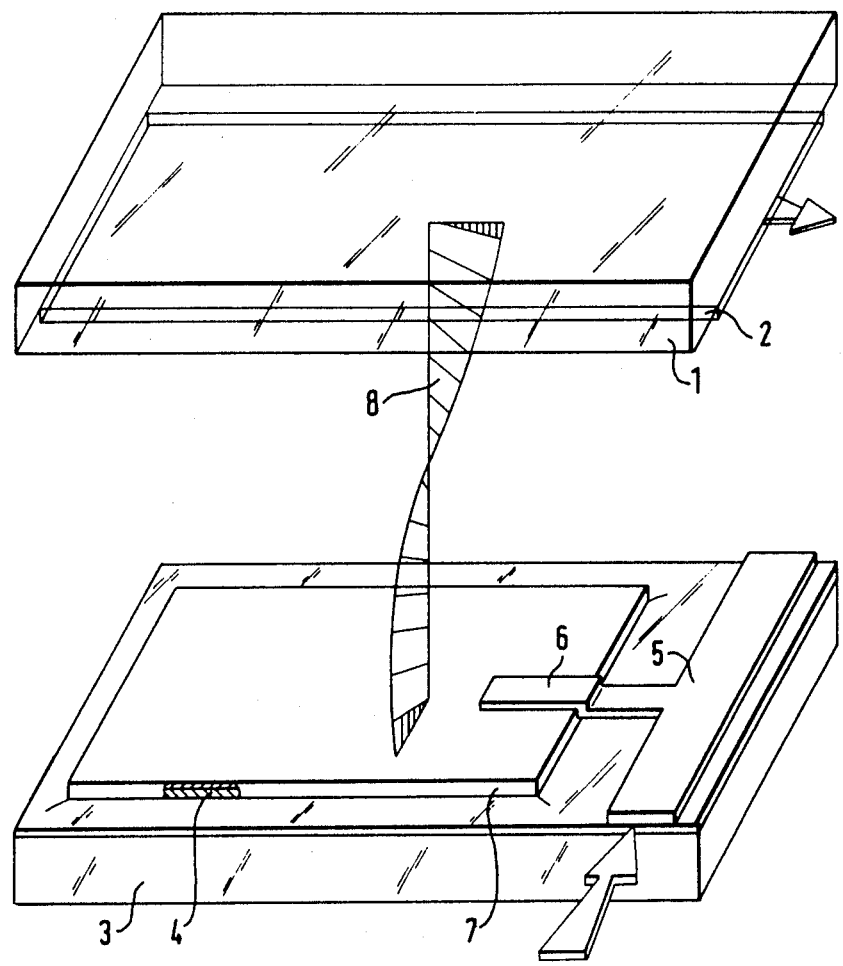
FIG. 2 is a second embodiment example of a liquid-crystal cell partially in exploded view.

The liquid-crystal cells shown in the figures are made of an upper substrate 1 of glass, which bears a controllable strip electrode 2. In the construction of a liquid-crystal cell, it is understood that there are numerous additional strip electrodes 2 (not shown) arranged in a side-by-side array. FIGS. 1 and 2 show only portions of one strip electrode 2, providing a single picture element, the remainder of the strip electrode 2 being indicated by the arrow. The lower substrate 3, which also is made of glass, bears a picture electrode 4.

Figure 3:
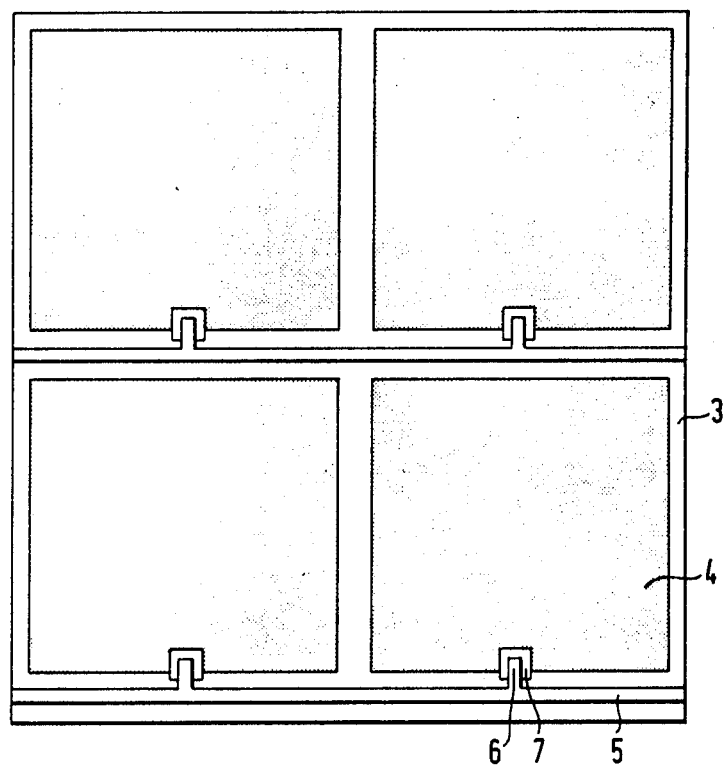
FIG. 3 is a top view of a portion of a substrate having four picture electrodes, each of which provides a single picture element.

A data line 5 and, in one piece therewith, a connecting contact 6 leading to the picture electrode 4 are furthermore arranged on the substrate 3. The data line 5 connects the picture electrode 4 with numerous other electrodes of the same form (not shown in FIGS. 1 and 2) arranged in a row with the picture electrode 4, the remainder of the row being indicated by the arrow. Thus, the resulting display is formed of a dot-matrix of the picture elements. Between the connecting contact 6, which partially overlaps the picture electrode 4, and said picture electrode 4 there is arranged an insulating layer 7 which, in FIGS. 1 and 3, covers only about the size of the connecting contact 6, while in FIG. 2 it covers the entire picture electrode 4 as well as the entire part of the substrate 3 not covered by the picture electrode 4.

Between the substrates, which are shown spaced part from each other in exploded view in FIGS. 1 and 2, there is arranged the liquid crystal substance (not shown) which is indicated symbolically by a helix 8.

The picture electrode 4 as well as the data lines 5 and the connecting contacts 6, which form a single application layer, are formed of indium tin oxide and are thus transparent. The insulating layer is also transparent, so that no impairment of the legibility of the display can result from any of these parts.

If the insulating layer 7 has an index of refraction which lies between the index of refraction of the liquid-crystal substance and the index of refraction of the transparent picture electrode and if it furthermore has properties which orient the adjoining liquid-crystal substance, then several functions will be performed by it, and the further operations which would otherwise be necessary in order to produce layers performing these functions are saved.

Further details in the construction of metal-insulator-metal devices is provided in FIG. 1 of an article entitled "The Optimization of Metal-Insulator-Metal Non-linear Devices for use in Multiplex Liquid Crystal Displays" by D. R. Baraff et al, appearing in the IEEE transaction on electronic devices, volume E-28, No. 6, June 1981 on pages 736-739.

We claim:

1. In a multiplexable liquid-crystal cell having two substrates which are spaced from each other and form between each other a cell space filled with liquid-crystal substance, the cell having strip electrodes arranged on one of the substrates on the side of the cell space and picture electrodes arranged opposite the strip electrodes side on the other substrate on the side of the cell space, the picture electrodes being connected via metal-insulator-metal elements with data lines, the latter being also arranged on said other substrate, the improvement comprising
a separate insulating layer disposed on each of said picture electrodes, each of said picture electrodes being located between said insulating layer and said other substrate, and
a connecting contact carried by said insulating layer and laying on a side of said insulating layer opposite said other substrate, said connecting contact leading to one of said data lines, and wherein
said picture electrode, in combination with said insulating layer and said connecting contact, forms a metal-insulator-metal connection.

2. The multiplexable liquid-crystal cell as set forth in claim 1, wherein
said insulating layer is transparent.

3. The multiplexable liquid-crystal cell as set forth in claim 2, wherein
said insulating layer covers said picture electrodes.

4. The multiplexable liquid-crystal cell as set forth in claim 3, wherein
said insulating layer has an index of refraction which is between the index of refraction of the liquid-crystal substance and the index of refraction of the transparent picture electrodes.

5. The multiplexable liquid-crystal cell as set forth in claim 4, wherein
said insulating layer has an index of refraction of between 1.4 and 2.0.

6. In a multiplexable liquid-crystal cell having two substrates which are spaced from each other and form between each other a cell space filled with liquid-crystal substance, the cell having strip electrodes arranged on one of the substrates on the side of the cell space and picture electrodes arranged opposite the strip electrodes side on the other substrate on the side of the cell space, the picture electrodes being connected via metal-insulator-metal elements with data lines, the latter being also arranged on said other substrate, the improvement comprising
a separate insulating layer disposed on each of said picture electrodes and covering said picture electrodes, said insulating layer having an index of refraction which is between the index of refraction of the liquid-crystal substance and the index of refraction of the transparent picture electrodes, and
a connecting contact carried by said insulating layer, said connecting contact leading to one of said data lines, and wherein
said insulating layer has an index of refraction of 1.8, and said picture electrode, in combination with said insulating layer and said connecting contact, forms a metal-insulator-metal connection.

7. The multiplexable liquid-crystal cell as set forth in claim 1, wherein
said insulating layer orients the adjoining liquid-crystal substance.

8. The muliplexable liquid-crystal cell as set forth in claim 1, wherein
said data lines and said connecting contact are made of a transparent material.

9. The multiplexable liquid-crystal cell as set forth in claim 8, wherein
said transparent material is indium tin oxide.

10. The multiplexable liquid-crystal cell as set forth in claim 1, wherein
said connecting contact serves as one element of said metal-insulator-metal connection, and
said data lines and the connecting contacts are applied in one operation.

11. The multiplexable liquid-crystal cell as set forth in claim 1, further comprising
an anti-reflection layer which covers the picture electrodes and the data lines and the connecting contact.

12. The multiplexable liquid-crystal cell as set forth in claim 11, wherein
said anti-reflection layer orients the adjoining liquid-crystal substance.

13. The multiplexable liquid-crystal cell as set forth in claim 11, wherein
said anti-reflection layer has an insulating property.

14. The multiplexable liquid-crystal cell as set forth in claim 1, wherein
each of said data lines is positioned parallel to the strip electrodes and opposite the intermediate space between two strip electrodes.

15. The multiplexable liquid-crystal cell as set forth in claim 1, wherein
said data lines are made of a transparent material.

16. The multiplexable liquid-crystal cell as set forth in claim 1, wherein
said connecting contact is made of a transparent material.

17. The multiplexable liquid-crystal cell as set forth in claim 1, further comprising an anti-reflection layer which covers the picture electrodes.

18. The multiplexable liquid-crystal cell as set forth in claim 1, further comprising
an anti-reflection layer which covers the data lines.

19. The multiplexable liquid-crystal cell as set forth in claim 1, further comprising
an anti-reflection layer which covers the connecting contact.

* * * * *